United States Patent [19]
Rowland

[11] Patent Number: 5,536,355
[45] Date of Patent: Jul. 16, 1996

[54] PROCESS AND APPARATUS FOR REMOVING LABELS FROM DRUMS

[75] Inventor: Robert A. Rowland, Littleton, Colo.

[73] Assignee: Rowland Engineering & Manufacturing, Inc., Littleton, Colo.

[21] Appl. No.: 220,552

[22] Filed: Mar. 31, 1994

[51] Int. Cl.⁶ ........................................ B32B 35/00
[52] U.S. Cl. ............................. 156/344; 156/584; 15/57; 15/70; 451/9; 451/10; 451/67; 451/178
[58] Field of Search .................... 156/344, 584; 15/57, 59, 70; 51/2 B, 2 H, 2 K, 16, 22; 451/9, 10, 67, 68, 178, 179

[56] References Cited

U.S. PATENT DOCUMENTS

| | | | |
|---|---|---|---|
| 2,195,202 | 3/1940 | Connal | 15/57 |
| 2,454,924 | 11/1948 | Hurst | 15/57 |
| 2,794,195 | 6/1957 | Kaye | 15/57 |
| 2,889,566 | 6/1959 | Parks | 15/70 X |
| 3,987,711 | 10/1976 | Silver | 156/252 X |
| 4,013,497 | 3/1977 | Wolf | 156/584 X |
| 4,325,775 | 4/1982 | Moeller | 156/584 |
| 4,599,131 | 7/1986 | Matuszak | 156/584 |
| 4,715,920 | 12/1987 | Ruppman et al. | 156/584 X |
| 5,222,269 | 6/1993 | Walker | 15/57 X |

FOREIGN PATENT DOCUMENTS 3521542  12/1986  Germany ............................. 156/584

Primary Examiner—Mark A. Osele
Attorney, Agent, or Firm—Kent A. Herink; Brian J. Laurenzo; Davis, Brown, et al.

[57] ABSTRACT

A process and apparatus for loosening adhesive from a drum and abrading labels, paint, and adhesive from the drum with high speed brushes. The drums are heated with an open flame to loosen the adhesive before the labels, paint, and adhesive are abraded from the drums with the brushes. A "soft-touch" pneumatic controller is connected to the brushes to maintain optimum contact of the brushes with the drum and to prevent premature wearing of the brushes. The drum is moved horizontally relative to the brushes during the brushing process to prevent stripes of paint being left on the drum by the brushes.

23 Claims, 8 Drawing Sheets

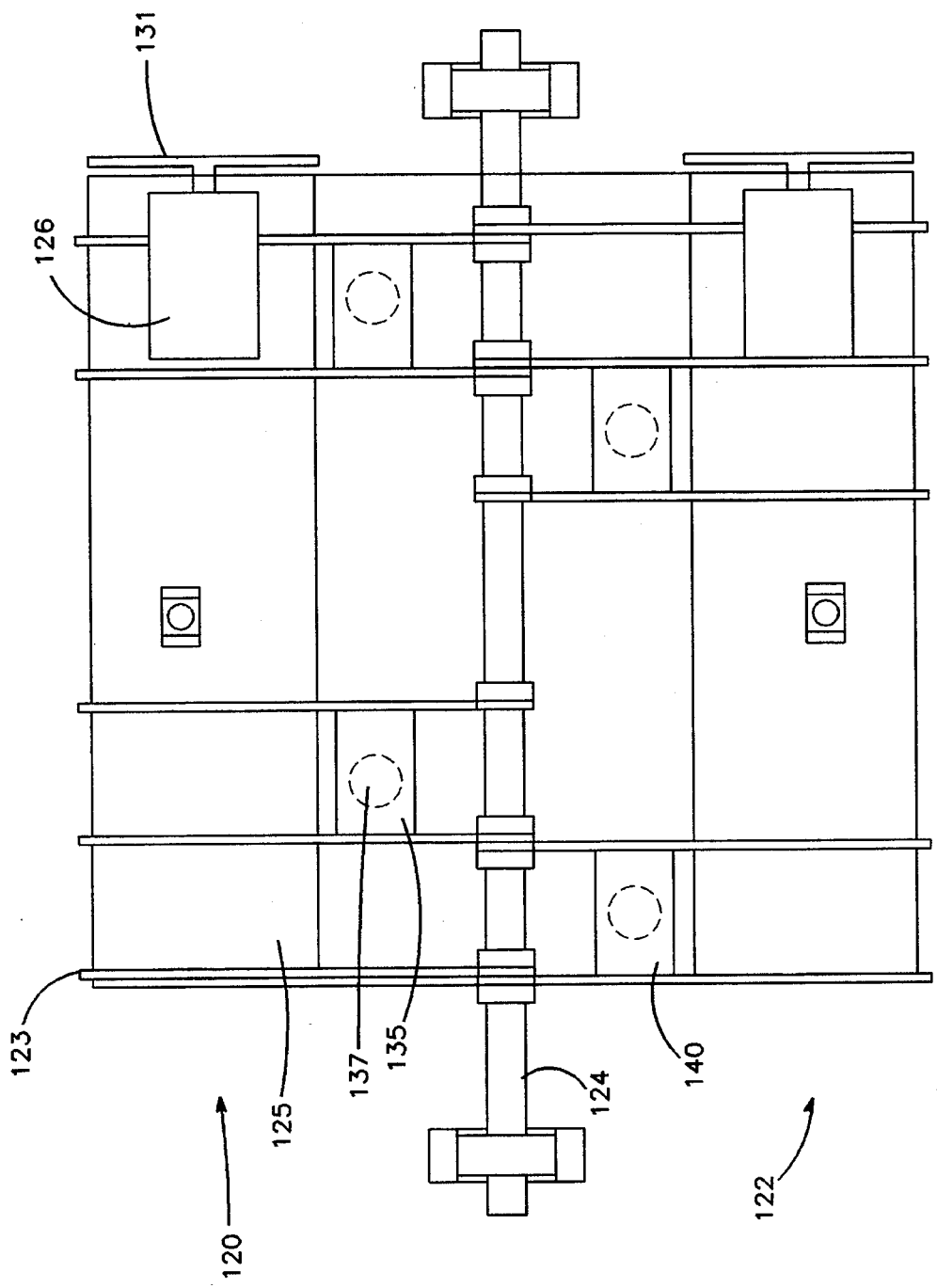

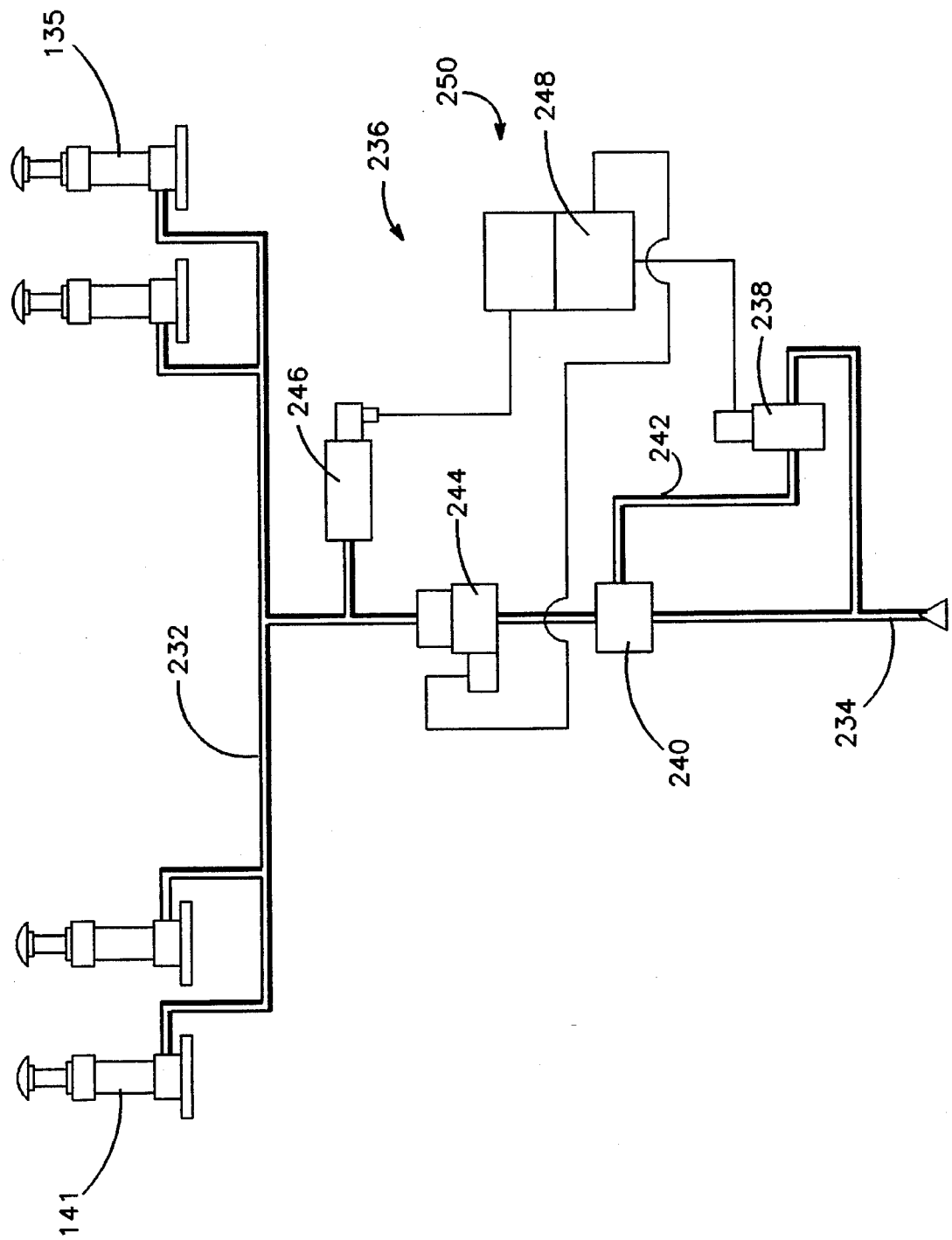

PROCESS AND APPARATUS FOR REMOVING LABELS FROM DRUMS

BACKGROUND OF THE INVENTION

The present invention relates generally to a process and apparatus for removing a label from a drum and, more particularly, to a process and apparatus for heating adhesive holding the label to the drum and abrading the label and the adhesive from the drum with a rotating brush.

Once 55-gallon drums have been filled with material and sealed, it is impossible to determine the contents of the drum merely by exterior inspection. Accordingly, preprinted labels containing information regarding container material safety data, date of manufacture, and date of filling are typically applied to drums either immediately before or immediately after filling. Should these labels become detached from the drums, the drum may have to be opened to determine its contents. In some instances, it may be necessary to perform laboratory tests to determine the exact contents of a labeless barrel. In extreme circumstances, the contents may have to be destroyed if the contents cannot be determined with accuracy. In an effort to reduce the time, effort and cost involved in identifying the contents of unmarked drums, manufacturers typically apply labels with fail-safe adhesives which tenaciously bond the labels to the drums.

Although these adhesives significantly curtail the incidence of labels being inadvertently removed from drums, they pose a significant problem to drum reconditioners who must remove the labels before putting the drums back into circulation.

Labels are typically removed from drums by the laborious processes of soaking the barrel in a hot liquid, spraying the labels with hot water, or spraying the labels with high pressure water. Although these processes are adequate for removing labels from drums, they are inadequate to remove the adhesive from the drums along with the labels. Remaining adhesive creates a problem for subsequent barrel reconditioning processes such as painting.

Most drums are painted to make them easy to identify and differentiate from drums holding different contents. Like labels, paint has heretofore been difficult to remove from drums. Due to this difficulty, drums are often repainted without first removing the old paint. This leads to premature cracking of the paint and is, therefore, undesirable.

It is known in the art to remove labels, adhesive, and paint from drums with hand sanding techniques. While this method works well at removing even the label and paint, the process is extremely cost and labor intensive. Furthermore, since there is no way to monitor precisely the pressure of the sanding apparatus on the drum, the abradant must be constantly replaced due to premature wear on the abradant.

Labels may also be removed with caustic chemicals. Disposing of used chemicals, however, poses an environmental hazard. Furthermore, such chemicals are costly and pose a chemical burn hazard to nearby workers.

The difficulties encountered heretofore are substantially limited by the present invention.

SUMMARY OF THE INVENTION

Accordingly, it is an object of the present invention to provide a process and apparatus for efficiently removing labels and adhesives from drums.

It is another object of the present invention to provide a process and apparatus for quickly removing labels and adhesives from drums.

A further object of the present invention is to provide a process and apparatus for fully removing adhesives from drums as the labels are removed.

Another object of the present invention is to provide a process and apparatus for automatically removing adhesives from drums as the labels are removed.

Still another object of the present invention is to provide a process and apparatus for abrading labels and adhesives from drums while minimizing the wear on the abradant.

Another object of the present invention is to provide a process and apparatus for removing labels and adhesives from drums by maintaining an abradant at an efficient removal orientation relative to the barrel.

Yet another object of the present invention is to provide a process and apparatus for removing paint from drums without stripes.

Still another object of the present invention is to provide a process and apparatus for removing labels and adhesives from drums with self-cleaning brushes. These and other objects of the invention will become apparent upon reference to the following specification, drawings and claims. To this end, a process and apparatus for removing a label adhered to a drum with an adhesive is provided. The drum is heated to a temperature sufficient to loosen the adhesive holding the label on the drum. The apparatus rotates the drum as it is heated and the label and adhesive are abraded from the drum.

In the preferred embodiment of the present invention, the drums are heated with flames to bring the adhesive to a predetermined temperature. Pneumatically controlled brushes are then moved into engagement with the rotating drum so that only tips of bristles on the brush contact the label and adhesive. The pneumatic control of the brush tips allows efficient removal of the labels and the adhesive, while extending the life of the brushes.

BRIEF DESCRIPTION OF THE DRAWINGS

FIG. 6 is a top view of the pneumatically controlled gates of the present invention;

FIG. 9 is a schematic showing the controls for the pneumatically actuated cylinders of the present invention.

DETAILED DESCRIPTION OF THE DRAWINGS

Figure 2:
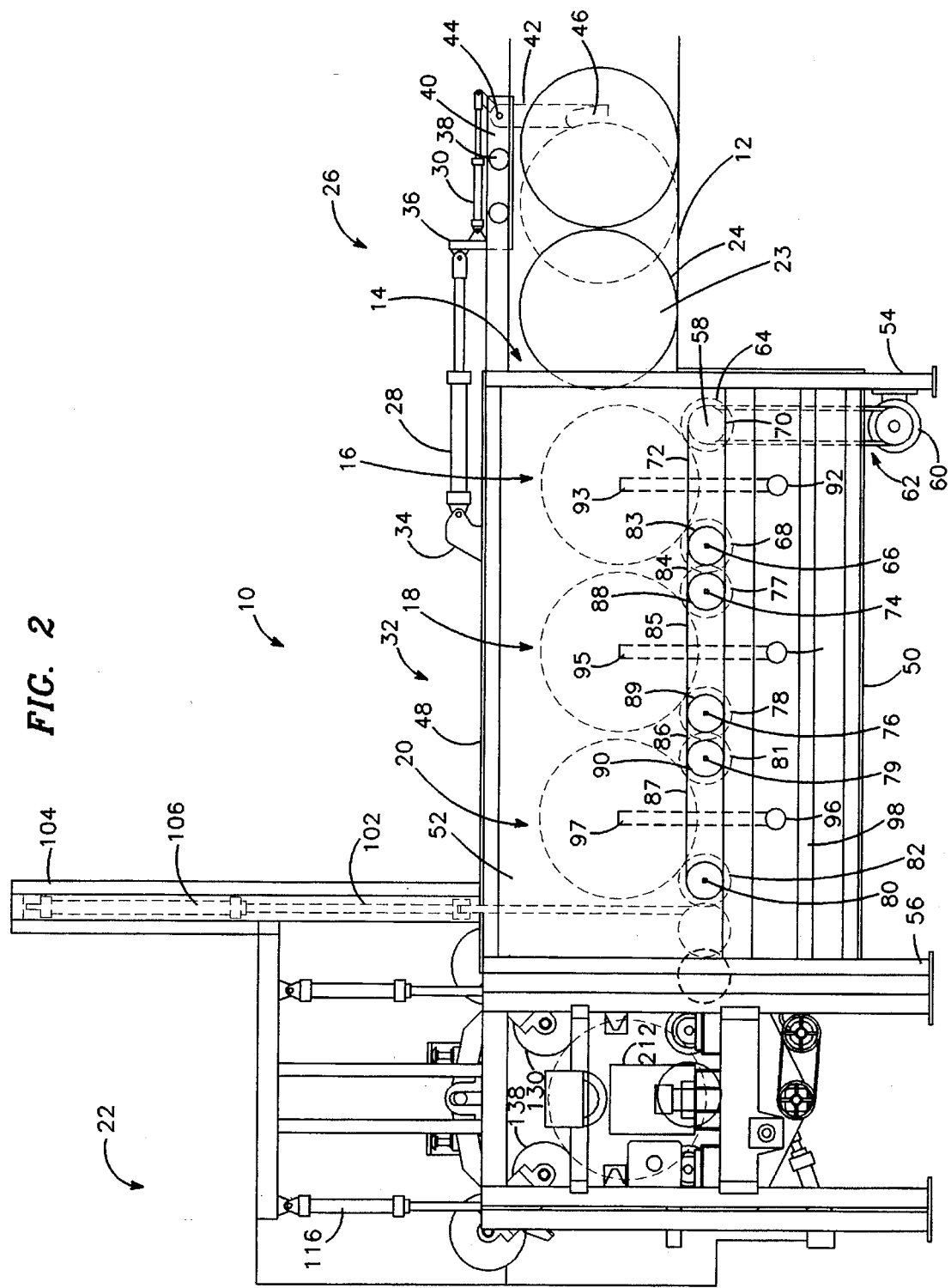
FIG. 2 is a side view in partial cut-away of the label remover of the present invention.
Figure 3:
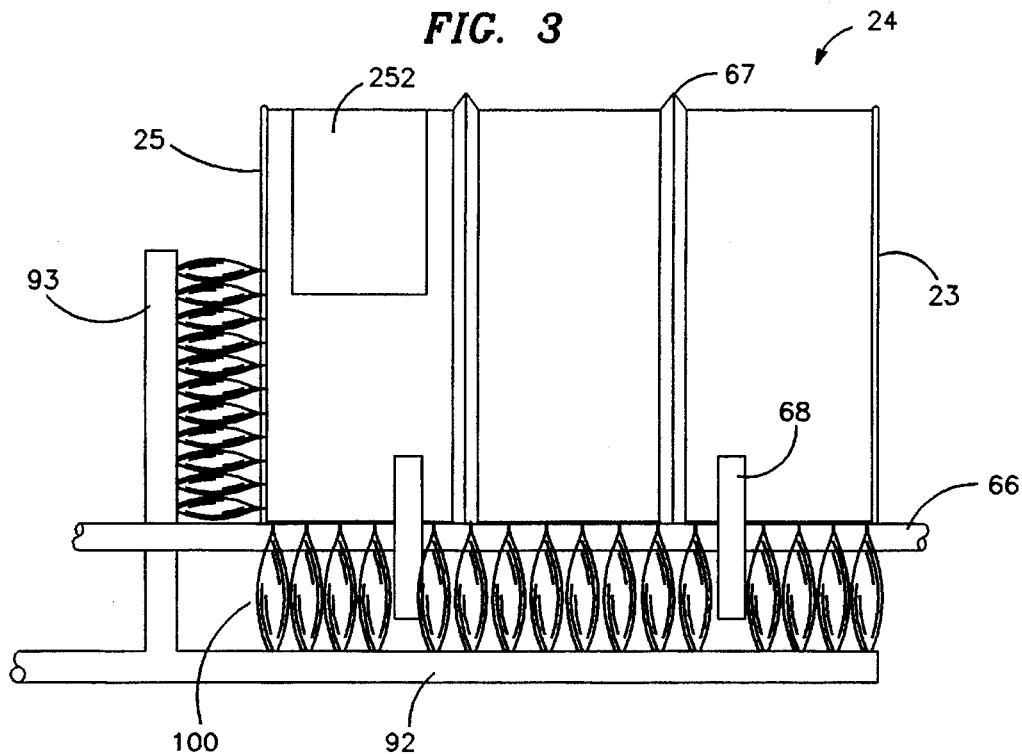
FIG. 3 is a front end view in partial cutaway of a drum within the oven.

The process and apparatus of the present invention include a drum label remover 10 provided with an indexing arm 26 which moves a drum 24 having a base 23 and a head 25 into the label remover 10 (FIGS. 2 and 3). The drum 24 first enters an oven 32 where the drum 24 is rotated over in-line air assist burners 92, 94 and 96 until reaching a pre-determined temperature. The drum 24 is then moved into a brushing station 22 where the drum 24 is rotated as brushes 130, 138, and 212 are moved against the drum 24 to remove a label 252 and adhesive from the drum 24. The drum 24 is then moved out of the brushing station 22 and is ready for further processing.

In the figures, there is shown the drum label remover 10 having an index arm platform 12, an oven entrance 14, a first oven station 16, a second oven station 18, a heat distribution and maintenance station 20, and the brushing station 22 (FIG. 2). The index arm platform 12 is connected to the oven 32 and is fed by a supply conveyer (not shown) which moves the drum 24 onto the platform 12. Located above the platform 12 is the indexing arm 26 which has a pair of hydraulic cylinders 28 and 30. The first cylinder 28 is operably connected to the oven 32 by means of a pivot bracket 34 welded to the oven 32 and bolted to a first end of the first cylinder 28. The second, opposite end of the first cylinder 28 is secured to a sled 36 having rollers 38 which ride along a pair of channels 40. The second cylinder 30 is pivotally secured on one end to the sled 36 and pivotally secured at the second, opposite end to a first end of an index arm 42. The index arm 42 is pivotally connected to the channels 40 by means of a pin 44 or similar pivot means. The second, free end of the index arm 42 is provided with a curved bracket 46 for contact engagement with the drum 24.

The oven 32 is a six-sided enclosure having an insulated steel top 48, bottom 50, and sides 52. (FIG. 2) The oven 32 is supported off the ground by a pair of rear posts 54 and a pair of front posts 56. A first axle 58 is journaled to the sides 52 of the oven 32. Secured to one of the rear posts 54 is a hydraulic motor 60 which rotatably drives the axle 58 by a chain and sprocket assembly 62. Secured to the first axle 58 is a first pair of spinners 64 which turn as the hydraulic motor 60 rotates the sprocket assembly 62. A second axle 66 is also journaled to the sides 52 of the oven 32. A second pair of spinners 68 are secured to the second axle 66. This second pair of spinners 68 coacts with the first pair of spinners 64 to rotate the drum 24 over the first line burner 92. The spinners 64 and 66 are one-inch wide steel cylinders having a seven-inch diameter. The spinners 64 and 66 are positioned to contact the drum 24 between rings 67 provided on the drum 24 and the base 23 and head 25 of the drum 24 (FIGS. 2 and 3).

Secured to the first axle 58 is a drive sprocket 70 which rotatably drives the second axle 66 by a second chain and sprocket assembly 72. Another pair of axles 74 and 76 are journaled to the sides 52 of the oven 32 and provided with pairs of spinners 77 and 78 which rotate the drum 24 over the second line burner 94. A third pair of axles 79 and 80 are journaled to the sides 52 of the oven 32 and are provided with pairs of spinners 81 and 82 which rotate the drum 24 over the third line burner 96. Secured to the second axle 66 is a drive sprocket 83 which rotatably drives the axles 74, 76 and 80 by chain and sprocket assemblies 84, 85, 86 and 87 and drive sprockets 88, 89 and 90 similar to the chain and sprocket assemblies 62 and 72 and drive sprockets 70 and 83 described above. Each pair of cooperating axles and associated spinners support and rotate the drum 24 above a corresponding one of the line burners 92, 94 or 96.

Flames 100 are supplied by the three in-line air assisted burners 92, 94 and 96 and three vertical in-line burners 93, 95 and 97 which are mounted to a burner support 98 (FIGS. 2 and 3). The in-line burners 92, 94 and 96 are provided along the length of the drum 24, while the vertical in-line burners 93, 95 and 97 are provided over an area equal in length to the radius of the head 25 of the drum. The burner support 98 is secured to the rear and front posts 54 and 56. The burners 92–97 are supplied with both natural gas and air to produce sufficient heat to loosen adhesive attached to the drum 24. It should be noted, however, that propane or any similar fuel may be used to produce the flames 100. In addition to the use of fire resistant fluid in all hydraulic lines, the drum label remover 10 is provided with three water sprinkler heads (not shown). Both the burners 92–97 and sprinkler heads are connected to a heat sensor (not shown) which shuts off the burners 92–97 and triggers the sprinkler heads if the heat becomes excessive.

Provided between the oven 32 and the brushing station 22 is a hydraulically actuated door 102 designed to maintain heat within the oven 32 and flying debris within the brushing station 22 (FIG. 2). Keeping flying debris out of the oven 32 reduces the chance of fire and prevents soot and smoke from building up within the oven 32. A cylinder bracket 104 is secured to the top of the oven 32 and connected to a hydraulic cylinder 106 which raises and lowers the door 102.

Figure 7:
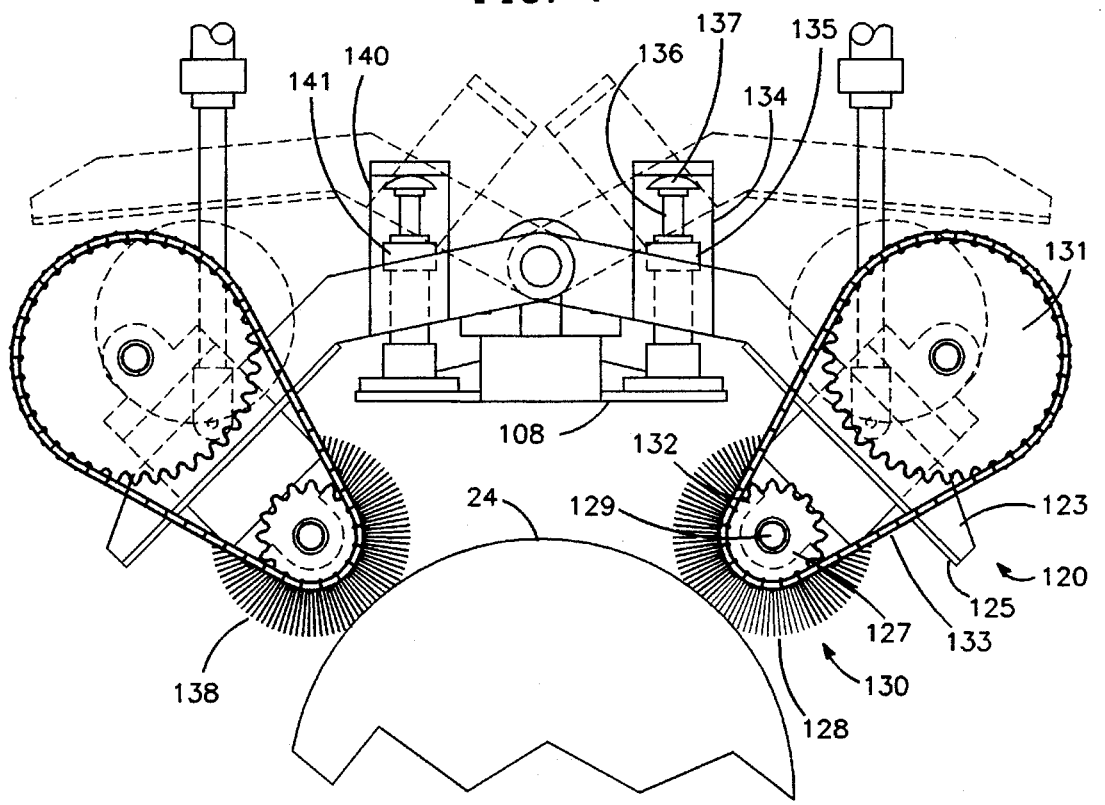
FIG. 7 is a side view of the pneumatically controlled gates of the present invention.
Figure 4:
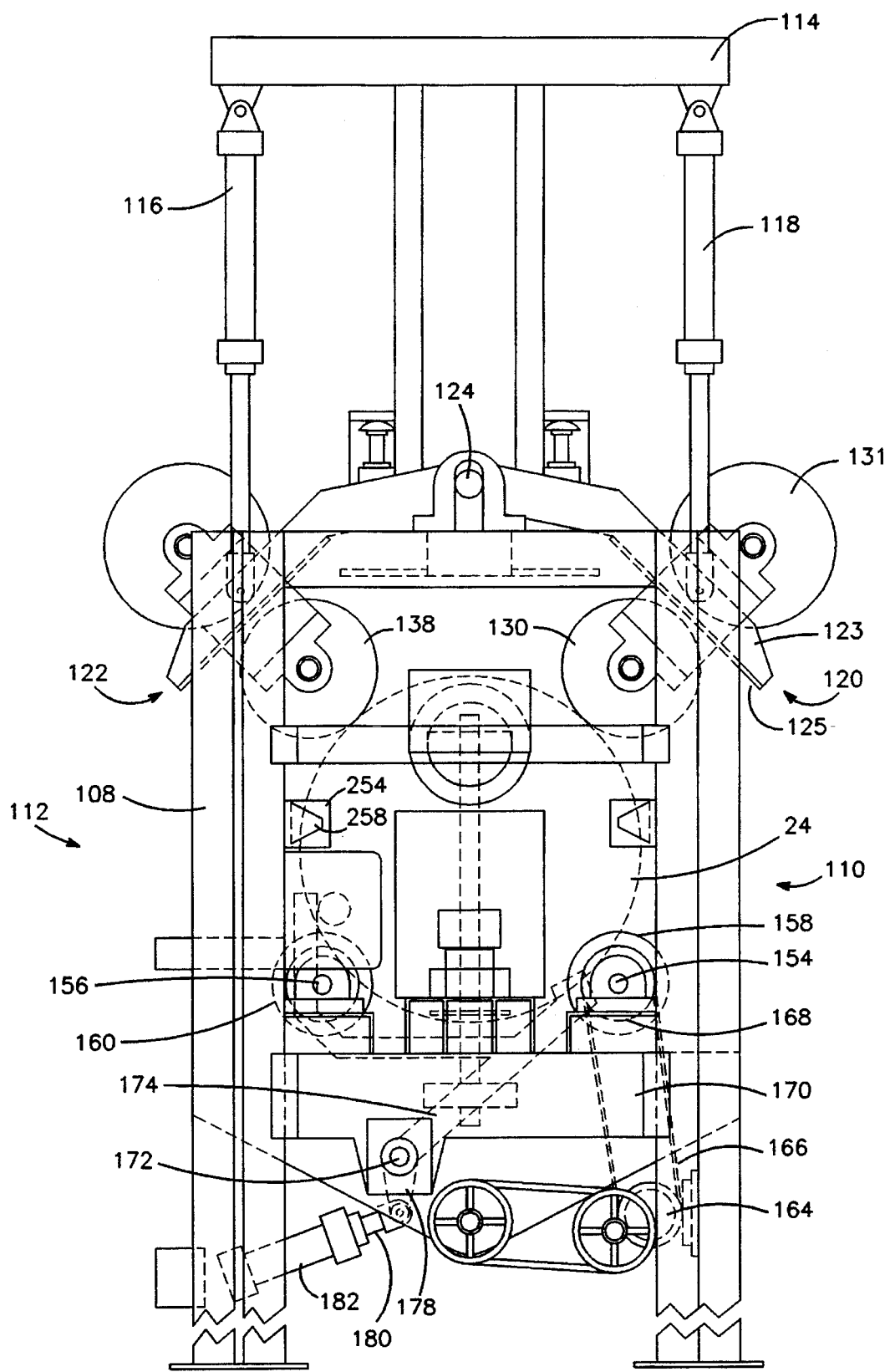
FIG. 4 is a side view in partial cut-away of the brushing station of the present invention.

The brushing station 22 is constructed of a steel frame 108 having a drum entrance 110 and drum exit 112 (FIG. 4). Secured to the top of the frame 108 is a steel support bracket 114. The support bracket 114 is pivotally connected to a front hydraulic cylinder 116 and a rear hydraulic cylinder 118. The hydraulic cylinders 116 and 118 are pivotally connected on one end to the steel support bracket 114 and on the opposite end to a pair of gates 120 and 122. As the gates 120 and 122 are essentially symmetrical, description will be limited to the rear gate 120. The gate 120 is made up of five curved arms 123 which are pivotally secured on one end to a gate shaft 124 (FIGS. 4 and 6). The opposite ends of the arms 123 are welded to a steel support plate 125. Secured to the top of the support plate 125 is a hydraulic motor 126. The rear cylindrical brush 130 is rotatably mounted on bushings 127 secured to the underside of the support plate 125 (FIG. 7). The brush 130 is a plurality of standard circular knot wheel brushes 128. The brushes 128 are stacked on a shaft 129 and secured thereto. The brushes 128 are secured tightly together to reduce striping caused by spaces between the brushes 128.

The hydraulic motor 126 is operably connected to a sprocket 131 (FIGS. 6 and 7). Similarly, a sprocket 132 is secured to the shaft 129. The sprockets 131 and 132 are interconnected by a chain 133 to transfer power from the hydraulic motor 126 to the brush 130.

Figure 1:
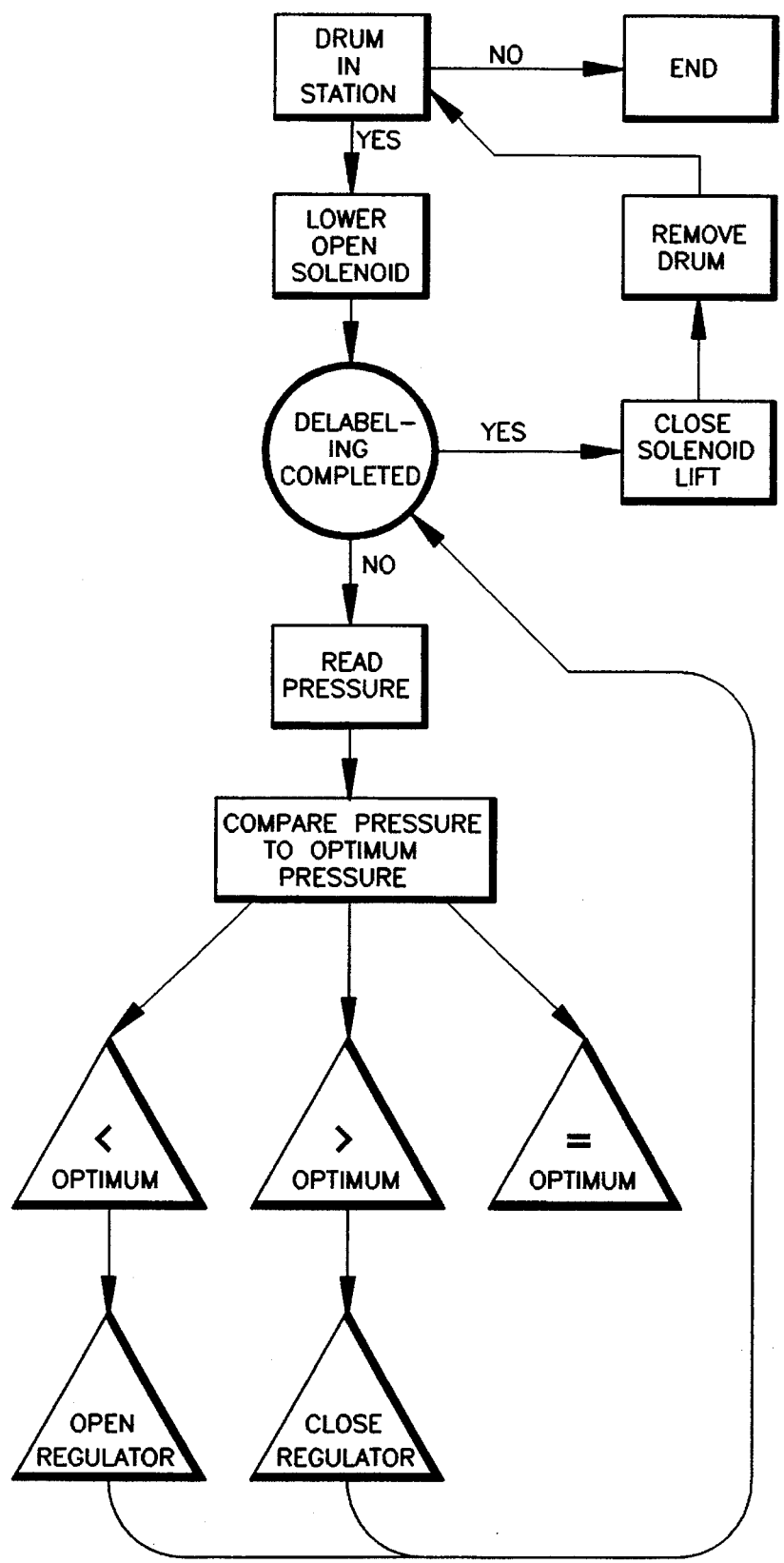
FIG. 1 is a flowchart showing the feed-back control of the pneumatically actuated brushes.
Figure 5:
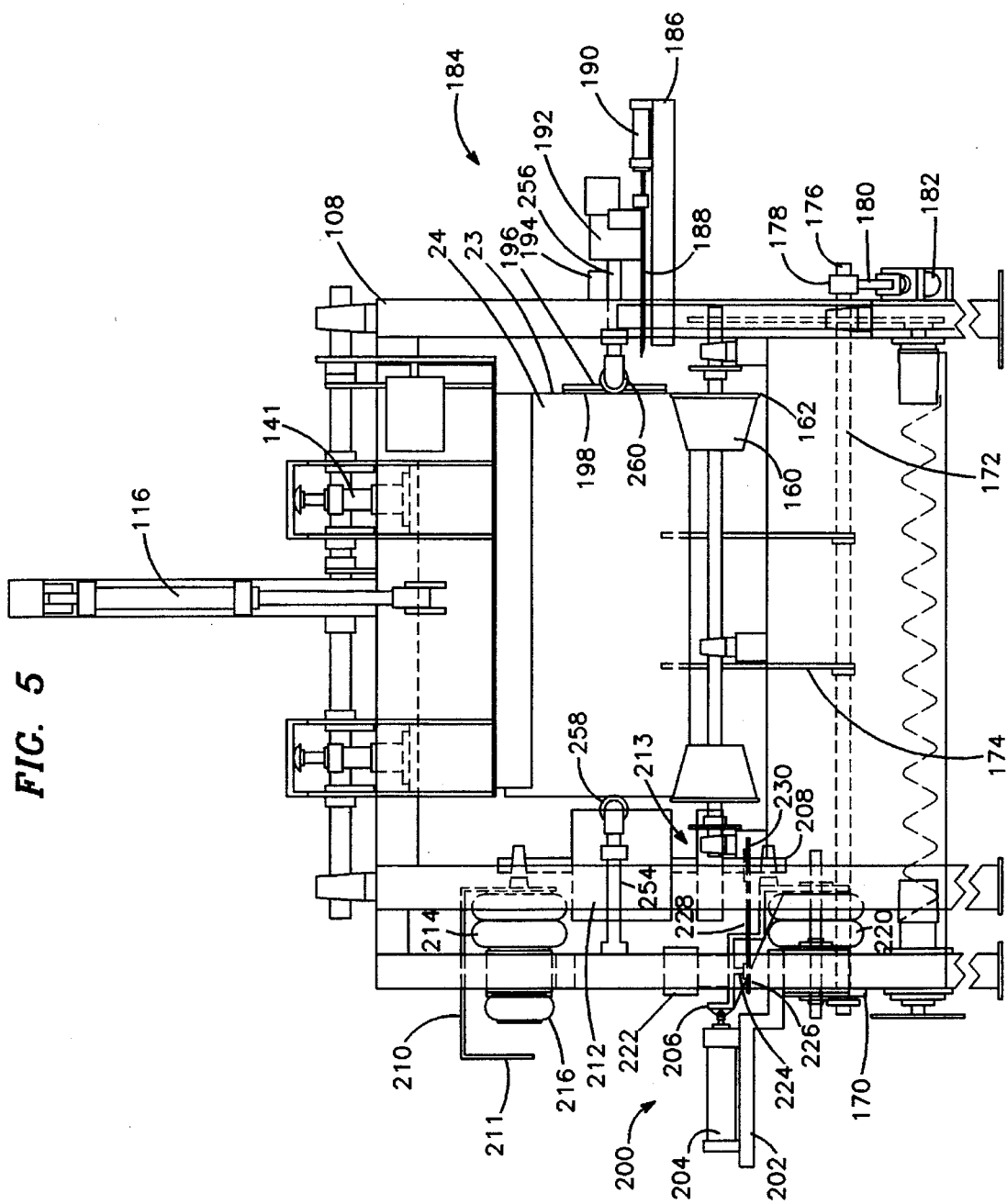
FIG. 5 is a front end view in partial cut-away of the brushing station of the present invention.

The brushing station 22 is provided with a soft-touch system which assures the proper amount of brush pressure is being applied to the drum 24. Each gate 120 and 122 is provided with a pair of U-frames 134 welded to the arms 123 of the gates 120 and 122 (FIG. 7). Four standard hydraulic cylinders 135 are secured to the frame 108 and are provided with piston rods 136 and caps 137 designed to support the gate 120 (FIGS. 5, 6, and 7). The cylinders 135 are run pneumatically rather than hydraulically to reduce the risk of expansion of hydraulic fluid due to the heat of the oven 32 and the drum 24 (FIGS. 1 and 7). The pneumatic operation also gives the hydraulic cylinders 135 a soft-touch, shock absorbing characteristic due to the compressibility of air. Like the rear gate 120, the front gate 122 is also provided with a brush 138 and a pair of shoulders 140 (FIG. 7). The front gate 122 is also supported by a pair of hydraulic cylinders 141.

Journaled to the frame 108 are a rear axle 154 and a front axle 156 (FIG. 4). Connected to the rear axle 154 are a pair of spinners 158. Similarly, a pair of spinners 160 are connected to the front axle 156. The spinners 158 and 160 are of a frustoconical shape and are provided with radially extended end flanges 162 (FIGS. 4 and 5). The end flanges 162 are provided to keep the drum 24 centered and to prevent the drum 24 from moving off of the spinners 158 and 160. The rear spinners 158 are driven by a hydraulic motor 164 secured to the frame 108. (FIG. 4). The motor 164 is connected by means of a chain 166 to a sprocket 168 secured to the front axle 154. The front axle 156 and associated spinners 160 are driven with a chain and sprocket assembly (not shown) connected to the rear axle 154.

A pair of cross beams 170 are secured to the frame 108 below the spinners 158 and 160 (FIG. 4). An axle 172 is journaled at either end to the cross beams 170. Two spaced-apart kick-out arms 174 are secured to the axle 172. One end 176 of the axle 172 protrudes through one of the cross beams 170 and is secured to a lever arm 178 (FIG. 5). While a first end of the lever arm 178 is secured to the axle 172, the second, opposite end of the lever arm 178 is pivotally connected to a piston 180 of a hydraulic cylinder 182. The hydraulic cylinder 182 is pivotally secured to the frame 108 as shown in FIG. 4. Accordingly, extension of the piston 180 will pivot the kick-out arms 174 to eject the drum 24 in the brushing station 22 out the drum exit 112.

Provided on one side of the brushing station 22 is a barrel clamp 184, including a support stand 186 that is secured to the steel frame 108 (FIG. 5). Mounted on the support stand 186 is a sled 188 which is driven back and forth across the stand 186 by a hydraulic cylinder 190. A hydraulic motor 192 for rotating an axle 194 is carried on the sled 188. Secured to the end of the axle 194 is a cylindrical base rotator 196, the face of which is coated with rubber 198 or similar gripping material. Rotation of a drum 24 inside the brushing station 22 is governed and assisted by engagement of the base rotator 196 with the drum base 23 and rotation thereof by the motor 192.

The opposite side of the brushing station 22 is provided with a head brush assembly 200 (FIG. 5). Extending from the side of the frame 108 is a support stand 202 mounted to which is a hydraulic cylinder 204 that is operably connected to a lower brush support 206. An axle 208 is journaled between the lower brush support 206 and an upper brush support 210. Mounted on the axle 208 is the cylindrical head brush 212. The head brush 212 is preferably slightly longer than the radius of the drum 24 and provided with an opening 213 to prevent a bung (not shown) on the drum 24 from damaging the brush 212 and to prevent the bung from interfering with the soft-touch action of the head brush assembly 200.

Figure 8:
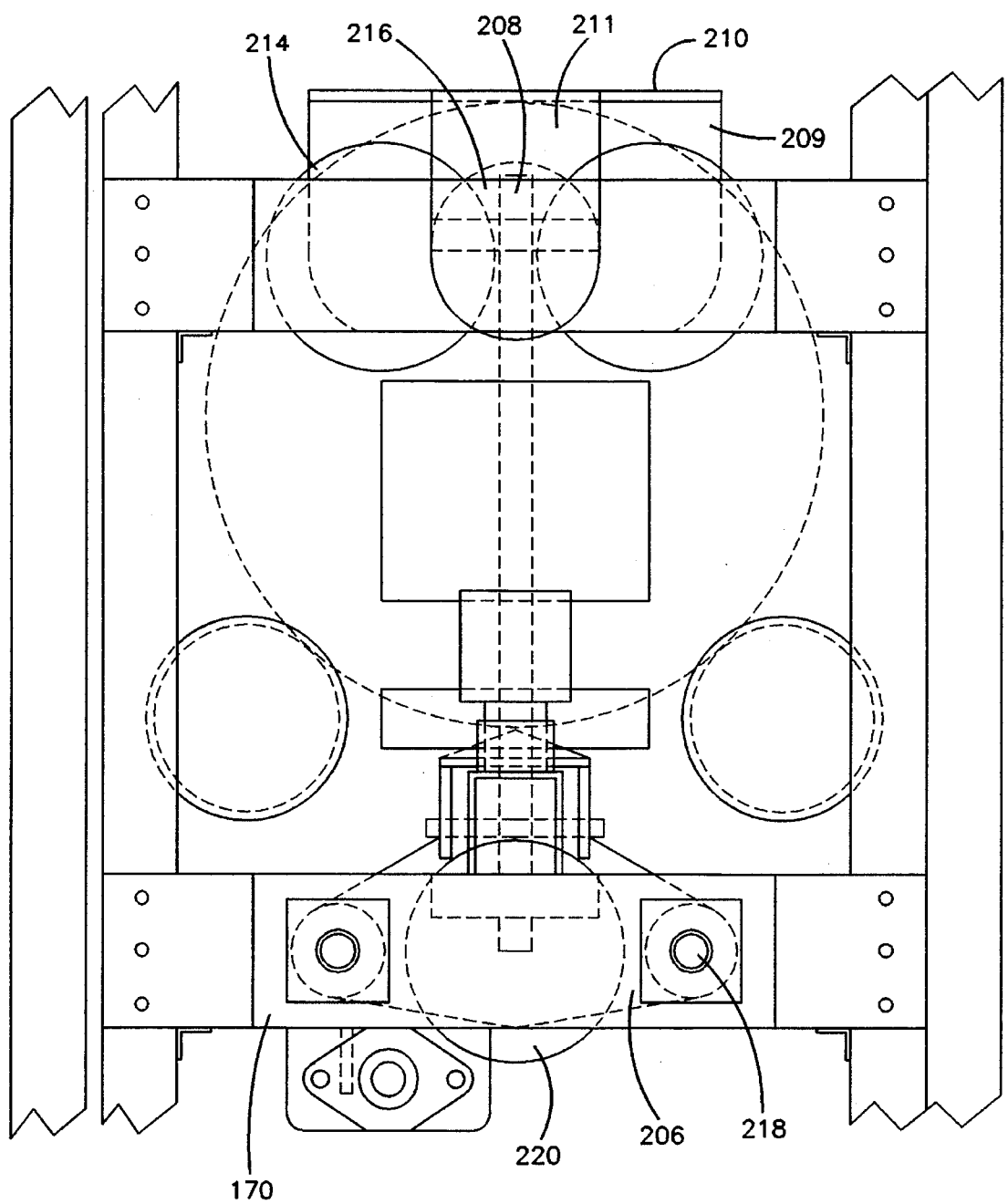
FIG. 8 is a side view in partial cut-away of the brushing station of the present invention.

The upper brush support 210 is provided with a wide front 209 and a narrower rear 211 (FIGS. 5 and 8). Secured between the front 209 of the upper brush support 210 and the frame 108 is a pair of upper actuators 214. The actuators 214 are partially hollow rubber with steel plates secured on either side. When the actuators 214 are inflated, the steel plates move apart. Because the actuators 214 are pneumatically operated, they can be quickly and precisely manipulated. Furthermore, since the actuators 214 are resilient, they provide a soft-touch, shock absorbing actuation. The steel plates allow the actuators 214 to be secured to other mechanical parts. The upper actuators 214 are secured to both the front 209 of the upper brush support 210 and to the frame 108 on either side of the axle 208. Secured to the frame 208, between the rear 211 of the upper brush support 210 and the frame 208, is a return actuator 216. Unlike the upper actuators 214 which are provided with two hollow interior portions apiece, the return actuator 216 has only a single hollow interior portion as its only function is to ensure that the head brush assembly 200 is fully retracted from the drum 24 when the brushing is complete.

The lower brush support 206 is slidably connected to a pair of guide pins 218 (FIGS. 5 and 8). The guide pins 218 are secured to and extend outward from one of the cross beams 170. Secured between the cross beam 170 and the lower brush support 206 is a lower actuator 220.

Mounted to the lower brush support 206 is a hydraulic motor 222 having an axle 224 protruding through the lower brush support 206 (FIG. 5). A sprocket 226 is secured to the axle 224. A chain 228, connects the sprocket 226 to a second sprocket 230 secured to the brush axle 208.

Preferably, the hydraulic cylinders 135 and 141 and actuator assemblies 214, 216 and 220 are driven by pneumatic pressure, but the hydraulic cylinders 135 and 141 may be driven by hydraulics or any similar fluid pressure producing means (FIGS. 5 and 7). FIG. 9 schematically diagrams the air pressure regulation system for the hydraulic cylinders 135 and 141. A similar air regulation system (not shown) is also connected to the actuator assemblies 214, 216, and 220 (FIG. 5) so description will be limited to regulation of the hydraulic cylinders 135 and 141 (FIG. 9). As shown in FIG. 9, the hydraulic cylinders 135 and 141 are connected to a pneumatic supply line 232, bringing air to the hydraulic cylinders 135 and 141. The pneumatic supply line 232 is fed by an inlet line 234 to which is connected a regulation assembly 236. The regulation assembly 236 has a master control 238 and an external pilot regulator 240 which are connected to one another by a pilot line 242. Both the master control 238 and the external pilot regulator 240 are connected to the inlet line 234. Connected between the regulation assembly 236 and the hydraulic cylinders 135 and 141 is a 4-way single coil operating valve 244 which serves as a solenoid to open and close the inlet line 234. Positioned on the inlet line 234, between the operating valve 244 and the hydraulic cylinders 135 and 141, is a transducer 246. As shown in FIG. 9, the regulation assembly 236, the operating valve 244, and the transducer 246 are all coupled to an analog digital converter portion 248 of an industrial computer 250 which controls their operation.

To begin operation of the drum label remover 10, the first cylinder 28 is extended and the second cylinder 30 retracted, thereby moving index arm 42 up. The drum 24 is fed onto the index arm platform 12 by a conveyor or similar drum provision means (FIG. 2). The second cylinder 30 is extended to move the index arm 42 on a downward arc and to move the curved bracket 46 into contact with the drum 24. The first cylinder 28 is then retracted, pulling the curved bracket 46 across the index arm platform 12 and moving the drum 24 through the oven entrance 14.

All of the spinners 64, 68, 77, 78, 81, and 82 are rotated by the hydraulic motor 60 as the drum 24 is moved into the oven 32 (FIG. 2). The drum 24 is constantly rotated to prevent the drum 24 from overheating to the point of deformation. The speed of rotation is selected based on the gauge of the steel from which the drum 24 is manufactured. The lighter the gauge, the faster the revolution, and the shorter the cycle time required to bring the drum 24 to the preheat temperature of 200° Fahrenheit. Preferably, the rotation of the drum 24 and the heat of the drum 24 are monitored by the industrial computer 250 (FIGS. 2 and 9). The industrial computer 250 monitors and adjusts the rotation of the drum 24 based on the heat of the drum 24 as determined by a heat sensor (not shown) to maintain the drum at the desired temperature.

As the body of the drum 24 is heated by the in-line burner 92, the head 25 of the drum 24 is heated by the vertical in-line burner 93 (FIG. 3). Preferably, the first in-line burner 92 is supplied with a sufficient mixture of natural gas and air to maximize the heat generated by the first in-line burner 92. One-half pound of gas pressure at seven and one-half to eleven inches of water column has been found to be sufficient to bring the drum 24 to the sufficient temperature. The first in-line burner 92 and vertical in-line burner 93 are positioned so that when the drum 24 is being rotated by the spinners 64 and 68, the flame 100 emanating from the first in-line burner 92 actually touches the drum 24 (FIGS. 2 and 3). As the label 252 is rotated along with the drum 24, the flames 100 actually come into contact with the label 252 to loosen any adhesive holding the label 252 to the drum 24. The drum 24 is maintained in the first oven station 16 until the head 25 and body of the drum 24 are heated to approximately 200° Fahrenheit. The drum 24 is preferably rotated at twelve revolutions per minute, but of course, may be rotated at any speed which evenly heats the drum 24, and prevents any one portion of the drum 24 from being heated to a point where the drum 24 begins to warp.

Once the drum 24 has been heated to approximately 200° Fahrenheit in the first oven station 16, the indexing arm 26 moves another drum through the oven entrance 14, thereby pushing the drum 24 into the second oven station 18 (FIG. 2). In the second oven station 18, the drum 24 is heated up to approximately 400° Fahrenheit by the second in-line burner 94. As in the first oven station 16, the flame of the second line burner 94 also licks the surface of the drum 24 at the heat point of the flame.

Once the drum 24 has reached the appropriate temperature in the second oven station 18, the indexer 26 forces another drum through the oven entrance 14, thereby moving the drum 24 into the heat distribution and maintenance station 20. In the heat distribution and maintenance station 20, the temperature of the drum 24 is preferably maintained at up to 400° Fahrenheit until the brushing station 22 is clear of drums. As the drum 24 is heated, the rear cylindrical brush 130 is raised. The hydraulic cylinder 106 is actuated to raise the door 102. The indexer 26 moves another drum through the oven entrance 14 and the drum 24 is pushed into the brushing station 22. The hydraulic cylinder 106 is then actuated to lower the door 102 and seal the oven 32 off from the brushing station 22.

As the drum 24 enters the brushing station 22, the front hydraulic cylinder 116 and the front cylindrical brush 138 are in the down position. The drum 24 contacts the brush 138 and is thereby prevented from rolling on through the brushing station 22 (FIG. 4). As soon as the drum 24 enters the brushing station 22, the rear hydraulic cylinder 116 is briefly actuated to lower the rear gate 120. When either gate 120 or 122 is lowered, the overhead hydraulic cylinders 116 and 118 are actuated for less than one-half of one second and the gates 120 and 122 move into position by gravity. After the gates 120 and 122 have been lowered, the cylinders 116 and 118 are locked off and do not affect the gates 120 and 122 again until the gates 120 and 122 are raised.

Once the drum 24 has entered the brushing station 22, the hydraulic motors 126 and pneumatically actuated hydraulic cylinders 135 and 141 are actuated (FIGS. 4 and 6). The barrel clamp 184 is provided with pressurized air to move the contact plate 196 into contact with the base 23 of the drum 24 and to push the drum 24 toward the head brush 212 (FIG. 5). Once the drum 24 has been moved as close to the head brush 212 as the end flange 162 of the knurled spinner 160 will allow, the hydraulic cylinder 190 is locked to trap a quantity of air within the cylinder 190. It is important to give each drum this common orientation toward the head brush 212 to account for variations in drum sizes. As the drum 24 is pushed, the hydraulic motor 192 rotates the drum 24 along with the spinners 158 and 160 (FIGS. 4 and 5).

The drive motor 164 and spinners 158 and 160 are used to rotate the drum 24 at approximately 20 revolutions per minute (FIGS. 4 and 5). This rotation is slightly faster than the approximately 12 revolutions per minute at which the drum 24 rotates in the oven 32 to increase the frequency with which the label 252 contacts the brushes 126 and 130. The brushes 130 and 138 are preferably rotated at 900 revolutions per minute which has been found to be a sufficient rotation rate to adequately clean the drum 24 while preventing undue wear on the brushes 130 and 138. The spinners 158 and 160 in the brushing station 122 are preferably knurled to prevent the drum 24 from slipping against the spinners 158 and 160 as the brushes 130 and 138 contact the drum 24.

The full weight of the gates 120 and 122, motors 126 and brushes 130 and 138 are kept from moving the brushes 126 and 130 too far into contact with the drum 24 by the soft-touch action of the cylinders 135 and 141 (FIGS. 4 and 7). As the gates 120 and 122 are lowered, the hydraulic cylinders 135 and 141 contact the shoulders 134 and 140 to maintain the brushes 130 and 138 at the proper orientation relative to the drum 24. To attain maximum delabeling efficiency, the brushes 130 and 138 should be rotated so that just the tips of the bristles contact the drum 24. This orientation decreases wear on the brushes 130 and 138 and allows most of the removed particles of label to be swept away from the drum 24 and brushes 130 and 138. Since most of the particles are thrown clear of the bristles, the brushes 130 and 138 are less likely to become clogged with the particles.

The hydraulic cylinders 135 and 141 maintain the brushes 130 and 138 at a proper orientation relative to the drum 24 (FIGS. 4 and 7). The use of air in the hydraulic cylinders 135 and 141 instead of hydraulic fluid creates a soft-touch action which aids in this orientation of the brushes 130 and 138 relative to the drum 24. Unlike hydraulic fluid, air is very compressible which gives the hydraulic cylinders 135 and 141 a shock absorbing capability which prevents abrupt changes in orientation which could damage the brushes 130 and 138.

As the delabeling proceeds, the transducer 246 constantly monitors the air pressure in the supply line 232 and feeds this information to the analog digital converter 248 of the industrial computer 250 (FIGS. 1 and 9). This pressure information is then compared with a predetermined optimal pressure programmed into the industrial computer 250. The pressure is thereafter adjusted to equal the predetermined optimum pressure.

If the pressure is less than the predetermined optimum pressure, then too much of the brushes 130 and 138 are contacting the drum 24 (FIG. 7). This situation prematurely wears the brushes 130 and 138, and prevents efficient cleaning of the drum 24 by the brushes 130 and 138. In this situation, the industrial computer 250 sends a signal to the regulation assembly 236 to allow more air from the inlet line 234 into the supply line 232 (FIG. 9). Conversely, if the pressure in the supply line 232, as measured by the transducer 246, is more than the predetermined optimum pressure noted within the industrial computer 250, not enough of the brushes 126 and 130 are contacting the drum 24 to adequately clean the drum 24 (FIGS. 7 and 9). Accordingly, the industrial computer 250 signals the regulation assembly 236 to decrease the pressure from the inlet line 234 to the supply line 232. In this way, the hydraulic cylinders 135 and 141 allow the gates 120 and 122 to drop and the brushes 130 and 138 to move into a proper orientation relative to the drum 24. If the pressure within the supply line 232, as measured by the transducer 246, is equal to the optimum pressure programmed into the industrial computer 250, then no signal is relayed from the industrial computer 250 to the regulation assembly 236. These pressure readings are constantly made until the drum is completely delabeled (FIG. 1).

A second soft-touch control system, similar to the soft-touch control system shown in FIG. 9, is operably connected to the actuators 214, 216 and 220 (FIG. 5). Like the soft-touch control system connected to the hydraulic cylinders 135 and 141, the second soft-touch control system connected to the actuators 214, 216 and 220 allows efficient cleaning of the head of the drum 24 and prevents undue wear on the head brush 212 (FIGS. 4 and 5).

During the delabeling of the drum 24, two pairs of hydraulic cylinders 254 and 256 move the drum 24 horizontally to eliminate striping and to prevent any build-up of any material in the brushes 130 and 138 (FIGS. 4 and 5). The pairs of cylinders 254 and 256 are secured to the frame 108 and are provided with pairs of tapered rollers 258 and 260 to allow the pairs of cylinders 254 and 256 to securely engage the chime of the drum 24 as the drum 24 is being rotated. The rollers 258 and 260 are tapered because cylindrical rollers tend to skip along the chime of the drum 24 instead of roll. When the drum 24 enters the brushing station 22, one pair of cylinders 256 pushes the drum 24 toward the head brush 212. After one-half of the cycle, the other pair of cylinders 256 move the drum 24 back toward its starting point to expose different portions of the drum 24 to the brushes 130 and 138. Regardless of how tightly the knot wheel brushes 128 are packed onto the shaft 129, the brushes 130 and 138 will tend to have a larger concentration of bristles in certain areas (FIG. 7). Accordingly, the portions of the drum 24 contacting these high concentration areas get cleaner than other areas. This leads to striping of the drum with alternating portions of clean and non-clean drum. By moving the drum 24 horizontally relative to the brushes 130 and 138, all portions of the drum 24 are moved against areas of the brushes 130 and 138 having high concentrations of bristles. Furthermore, as the brushes 130 and 138 are moved back and forth, the bristles move apart and open up to keep particles from being trapped in the brushes 130 and 138. While striping may be controlled with a screw-type brush, such brushes are significantly more expensive and do not have the self-cleaning benefit of the present invention.

The head brush 212 and the barrel clamp 184 move with the drum 24 to stabilize and clean the head of the drum 24 as the drum 24 is being moved horizontally (FIG. 5). Once the label 252 has been removed from the drum 24, the industrial computer 250 signals the operating valve 244 to close off the supply line 232 (FIGS. 5 and 9).

The return actuator 216 and the hydraulic cylinder 204 are provided with pressurized air to pull the head brush 212 away from the drum 24 as the barrel clamp 184 pulls the contact plate 196 away from the drum 24 (FIG. 5). The hydraulic cylinders 254 and 256 pull the rollers 258 and 260 away from the drum 24. The overhead cylinders 116 and 118 pull the gates 120 and 122 away from the drum 24 (FIGS. 4 and 7). After the drum 24 is clear, the hydraulic piston 182 is actuated, thereby moving the kick-out arms 174 into the drum 24 to move the drum 24 out of the brushing station 22.

The hydraulic cylinder 116 then drops the front gate 122 back down and the process is repeated as another drum is indexed into the brushing station 22. This process is continued until all drums are delabeled.

Although the invention has been described with respect to a preferred embodiment thereof, it is to be also understood that it is not to be so limited since changes and modifications can be made therein which are within the full intended scope of this invention as defined by the appended claims. For example, it should be noted that the drum label remover 10 is capable of removing labels from both steel and plastic drums.

What is claimed is:

1. A process for removing a label adhered to a drum with an adhesive, wherein the drum is heated to loosen the adhesive and the label and adhesive are abraded from the drum without damaging the drum, the process comprising:

(a) providing a flame;

(b) licking the label with said flame until the temperature of the adhesive is in excess of 250 degrees Fahrenheit;

(c) rotating the drum as said flame licks the label;

(d) providing a first brush having a first set of bristles with a first set of tips;

(e) rotating said first brush at about 500 to 1,000 revolutions per minute;

(f) removing a first portion of the label and a first portion of the adhesive from the drum by moving the label and the adhesive into contact with said first set of tips;

(g) rotating the drum as said first set of tips contacts the label;

(h) providing a second brush having a second set of bristles with a second set of tips;

(i) rotating said second brush at about 500 to 1,000 revolutions per minute;

(j) removing a second portion of the label and a second portion of the adhesive from the drum by moving said second set of tips into contact with the label and the adhesive;

(k) monitoring a first initial pressure of said first set of tips against the label;

(l) maintaining said first set of tips against the label and the adhesive at a first predetermined pressure in response to said monitoring of said first initial pressure;

(m) monitoring a second initial pressure of said second set of tips against the label; and (n) maintaining said second set of tips against the label at a second predetermined pressure in response to said monitoring of said second initial pressure.

2. An apparatus for removing a label adhered to a drum with an adhesive, wherein the drum is heated to loosen the adhesive, and the label and adhesive are abraded from the drum without damaging the drum, the apparatus comprising:

(a) a flame with sufficient heat to loosen the adhesive holding the label to the drum;

(b) means for moving the label into and out of contact with the flame; and (c) means for abrading the label from the drum.

3. The apparatus of claim 2, wherein said abrading means is a rotating brush having bristles with tips.

4. The apparatus of claim 3, further comprising means for rotating said brush at about 500 to 1,000 revolutions per minute.

5. The apparatus of claim 2, further comprising means for heating the adhesive in excess of 250 degrees Fahrenheit.

6. The apparatus of claim 3, further comprising means for monitoring and adjusting contact of said tips with the label to allow only a predetermined portion of said tips of said bristles to contact the label.

7. The apparatus of claim 6, wherein said monitoring and adjusting means comprises:
   (i) fluid pressurizing means;
   (ii) fluid powered means for moving brushes into and out of engagement with the label in response to changes in fluid pressure;
   (iii) a fluid conduit operably connected between said fluid pressurizing means and said moving means;
   (iv) a transducer operably connected to said fluid conduit;
   (v) fluid regulating means operably connected to said fluid conduit for regulating fluid flow from said fluid pressurizing means to said fluid powered means; and
   (vi) means operably connected between said transducer and said fluid regulating means for controlling fluid pressure within said fluid conduit in response to input received from said transducer.

8. The apparatus of claim 7, wherein said fluid powered means are a pneumatic linear actuator operably connected to said brush.

9. The apparatus of claim 8, further comprising means for moving said brush into and out of contact with the label as pressure within said fluid conduit is increased and decreased.

10. The apparatus of claim 8, further comprising an arm pivotally connected between the brush and a frame, and wherein said linear actuator is operably connected between said frame and said arm.

11. A process for removing a label adhered to a drum with an adhesive, wherein the drum is heated to loosen the adhesive, and the label is abraded from the drum without damaging the drum, the process comprising:
   (a) heating the adhesive to a temperature sufficient to loosen the adhesive holding the label on the drum by providing a flame and licking the label with said flame until the temperature of the adhesive is in excess of 250 degrees Fahrenheit;
   (b) rotating the drum; and
   (c) abrading the label and the adhesive from the drum.

12. A process for removing a label adhered to a drum with an adhesive, wherein the drum is heated to loosen the adhesive, and the label is abraded from the drum without damaging the drum, the process comprising:
   (a) heating the adhesive to a temperature sufficient to loosen the adhesive holding the label on the drum;
   (b) rotating the drum;
   (c) abrading the label and the adhesive from the drum by providing a brush having bristles with tips, rotating said brush, and bringing said tips of said bristles into contact with the label and adhesive;
   (d) monitoring said contact of said bristles with said label through a brush controller, said brush controller comprising a fluid pressurizer, fluid powered means for moving said tips into and out of engagement with the label in response to changes in fluid pressure, a fluid conduit operably connected between said fluid pressurizer and said fluid powered moving means, a transducer operably connected to said fluid conduit, fluid regulating means operably connected to said fluid conduit for regulating fluid flow from said fluid pressurizer to said fluid powered moving means, and means operably connected between said transducer and said fluid regulating means for controlling fluid pressure within said fluid conduit in response to input received from said transducer; and
   (e) adjusting said tips to allow only a predetermined portion of said tips to contact the label.

13. The process of claim 12, further comprising rotating said brush tips at about 500 to 1,000 revolutions per minute.

14. The process of claim 12, further comprising heating the adhesive above 250 degrees Fahrenheit.

15. The process of claim 12, further comprising moving said brush into and out of contact with the label as pressure within said fluid conduit is increased and decreased.

16. The process of claim 12, wherein said fluid powered means are a pneumatic linear actuator operably connected to said brush.

17. The process of claim 16, wherein said adjusting is accomplished using structure including an arm pivotally connected between the brush and a frame, and wherein said linear actuator is operably connected between said frame and said arm.

18. An apparatus for removing a label adhered to a drum with an adhesive, wherein the drum is heated to loosen the adhesive, and the label and adhesive are abraded from the drum without damaging the drum, the apparatus comprising:
   (a) a drum rotator;
   (b) a flame for heating the drum to a temperature sufficient to loosen the adhesive holding the label to the drum;
   (c) a brush; and
   (d) means for moving said brush into and out of contact with the label.

19. The apparatus of claim 18, further comprising means for moving said flame into contact with the label until the temperature of the adhesive is in excess of 250 degrees Fahrenheit.

20. An apparatus for removing a label adhered to a drum with an adhesive, wherein the drum is heated to loosen the adhesive, and the label and adhesive are abraded from the drum without damaging the drum, the apparatus comprising:
   (a) a drum rotator
   (b) means for heating the drum to a temperature sufficient to loosen the adhesive holding the label to the drum;
   (c) a brush having bristles with tips;
   (d) means for moving said brush into and out of contact with the label;
   (e) means for rotating said brush at a speed sufficient to remove the label from the drum when said tips are brought into contact with the label; and
   (f) means for monitoring and adjusting contact of said tips with the label to allow only a predetermined portion of said tips to contact the label, said monitoring and adjusting means comprising a fluid pressurizer, fluid powered means for moving said tips into and out of engagement with the label in response to changes in fluid pressure, a fluid conduit operably connected to said fluid pressurizer and said fluid powered moving means, a transducer operably connected to said fluid conduit, fluid regulating means operably connected to said fluid conduit for regulating fluid flow from said fluid pressurizer to said fluid powered moving means, and means operably connected between said transducer and said fluid regulating means for controlling fluid pressure within said fluid conduit in response to input received from said transducer.

21. The apparatus of claim 20, further comprising means for moving said brush into and out of contact with the label as pressure within said fluid conduit is increased and decreased.

22. The apparatus of claim 20, wherein said fluid powered moving means are a pneumatic linear actuator operably connected to said brush.

23. The apparatus of claim 22, further comprising an arm pivotally connected between the brush and a frame, and wherein said linear actuator is operably connected between said frame and said arm.

* * * * *